Figure 1:
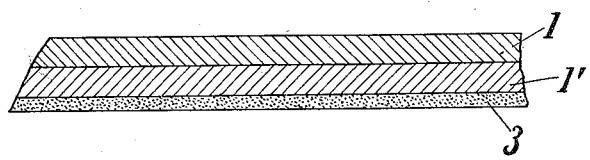

Aug. 25, 1931.  P. VEHL ET AL  1,820,168
PHOTOGRAPHIC ROLL FILM CARTRIDGE
Filed April 24, 1930

Inventors:
Paul Vehl.
Edward Schnitzler.
by Philip S. Hopkins,
Attorney.

Patented Aug. 25, 1931

1,820,168

UNITED STATES PATENT OFFICE

PAUL VEHL AND EDUARD SCHNITZLER, OF DESSAU IN ANHALT, GERMANY, ASSIGNORS TO AGFA ANSCO CORPORATION, OF BINGHAMTON, NEW YORK, A CORPORATION OF NEW YORK

PHOTOGRAPHIC ROLL FILM CARTRIDGE

Application filed April 24, 1930, Serial No. 447,039, and in Germany May 7, 1929.

Our present invention relates to photographic roll films and more particularly to protective paper strips used in manufacturing photographic roll films having a highly sensitive, especially panchromatic emulsion.

When using the known black and red protective paper generally used for photographic roll films in the manufacture of roll films containing highly sensitive, especially panchromatic film material, the said protective paper is not sufficiently impermeable to light, so that the film is liable to be attacked.

According to our present invention, the protective paper strip for photographic roll film cartridges can be made completely impermeable to light by providing that side of the paper strip which does not come in contact with the high sensitive emulsion layer with a coating of a cellulose derivative or of any other suitable colloid, this coating being colored by means of an inactinic dye or dye pigment.

For the said purpose we may use a great number of substances as, for instance, gelatin, natural resins such as caoutchouc, balata, colophony, copal, dammar resin, artificial resins such as vinyl ester condensation products, phenolformaldehyde condensation products, urea formaldehyde condensation products, and all known esters, mixed esters, ethers and ether esters of the carbonhydrates as, for instance, cellulose nitrate, starch nitrate, cellulose acetate, starch acetate, cellulose laurate, starch laurate, cellulose acetate butyrate, methyl-, ethyl-, benzyl-cellulose, ethyl cellulose acetate or the like. To give these coatings the desired degree of elasticity, we may add, if necessary, a softening agent, such as camphor, phthalic acid esters, waxes, balsams, castor oil, glycerin, glycol ethers and esters and so on.

This coating may be colored by means of a suitable inactinic dye or dye pigment, known in the art, preferably by a black dye such as, for instance, acid black 2 B, nigrosin D (Schultz, Farbstofftabellen, Vol. 1, No. 700), wool black 4 B (Farbstofftabellen No. 220), lamp black and so on.

In preparing our protective paper strips, a solution of one of the compounds mentioned above, in which the inactinic dye is dissolved or finely suspended, is applied to the red and black paper strip, preferably on its black side. The thickness of this coating and the quantity of dye, we use, may be varied in wide limits. It depends upon the brand of paper used and upon the sensitiveness of the light sensitive emulsion. The best result, however, will be found in each case by a simple experiment.

In the adhering drawings Fig. 1 shows a protective paper strip prepared according to our invention in cross section in an exaggerated scale.

1 and 1' indicate the protective paper being colored red on the one side and black on the other side. The black side is covered by a colloid coating 3 containing an inactinic dye.

Figure 2:
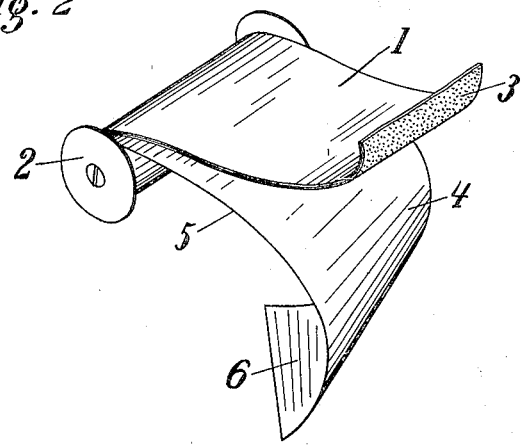

Fig. 2 shows a film cartridge 2 partly opened in which a protective paper strip prepared according to our invention, is used. The dye containing coating 3 of the protective paper covers the rear side 4 of the film 5 and does not come in contact with the high sensitive emulsion 6.

What we claim is:—

1. In a photographic film cartridge a film strip bearing a highly sensitive photographic emulsion, and a protective paper covered on the side which does not come in contact with the said highly sensitive emulsion, with a light impermeable coating consisting of a dry colloid layer and an inactinic dye.

2. In a photographic film cartridge a film strip bearing a highly sensitive photographic emulsion, and a protective paper covered on the side which does not come in contact with the said highly sensitive emulsion, with a light impermeable coating consisting of a dry colloid layer and a black dye.

3. In a photographic film cartridge a film strip bearing a highly sensitive photographic emulsion, and a protective paper covered on the side which does not come in contact with the said highly sensitive emulsion, with a light impermeable coating consisting of a dry colloid layer and lamp black.

4. In a photographic film cartridge a film strip bearing a highly sensitive photographic emulsion, and a black-red protective paper strip covered on the black side, which does not come in contact with the said highly sensitive emulsion, with a light impermeable coating consisting of a dry colloid layer and an inactinic dye.

5. In a photographic film cartridge a film strip bearing a highly sensitive photographic emulsion, and a black-red protective paper strip covered on the black side, which does not come in contact with the said highly sensitive emulsion, with a light impermeable coating consisting of a dry colloid layer and a black dye.

6. In a photographic film cartridge a film strip bearing a highly sensitive photographic emulsion, and a black-red protective paper strip covered on the black side, which does not come in contact with the said highly sensitive emulsion, with a light impermeable coating consisting of a dry colloid layer and lamp black.

In testimony whereof, we affix our signatures.

PAUL VEHL.
EDUARD SCHNITZLER.